United States Patent
Nobori et al.

(10) Patent No.: US 6,734,896 B2
(45) Date of Patent: May 11, 2004

(54) IMAGE PROCESSOR AND MONITORING SYSTEM

(75) Inventors: Kunio Nobori, Osaka (JP); Masamichi Nakagawa, Osaka (JP); Hirofumi Ishii, Kanagawa (JP); Shusaku Okamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 350 days.

(21) Appl. No.: 09/843,962

(22) Filed: Apr. 27, 2001

(65) Prior Publication Data

US 2002/0047901 A1 Apr. 25, 2002

(30) Foreign Application Priority Data

Apr. 28, 2000 (JP) .......................... 2000-130171

(51) Int. Cl.⁷ .............................. H04N 7/18; H04N 9/47
(52) U.S. Cl. ...................... 348/148; 701/301; 701/302; 382/284; 348/36; 348/152
(58) Field of Search ................. 701/301, 302; 348/148, 152, 36; 382/284

(56) References Cited

U.S. PATENT DOCUMENTS

| | | | | |
|---|---|---|---|---|
| 5,289,321 A | * | 2/1994 | Secor ........................... 359/896 |
| 5,488,674 A | * | 1/1996 | Burt et al. ................... 382/284 |
| 5,574,443 A | * | 11/1996 | Hsieh ........................... 340/901 |
| 5,670,935 A | * | 9/1997 | Schofield et al. ........... 340/461 |
| 5,680,123 A | * | 10/1997 | Lee .............................. 340/937 |
| 5,809,161 A | * | 9/1998 | Auty et al. ................... 382/104 |
| 6,160,849 A | * | 12/2000 | Igarashi et al. ......... 375/240.14 |
| 6,476,855 B1 | * | 11/2002 | Yamamoto .................. 348/148 |

FOREIGN PATENT DOCUMENTS

| JP | 58-110334 | 6/1983 |
|---|---|---|
| JP | 59189781 A | 10/1984 |
| JP | 03099952 A | 4/1991 |
| JP | 05010869 A | 1/1993 |
| JP | 08048198 A | 2/1996 |
| JP | 11-078692 | 3/1999 |

* cited by examiner

*Primary Examiner*—Andy Rao
*Assistant Examiner*—Charles E Parsons
(74) *Attorney, Agent, or Firm*—Harness, Dickey & Pierce, P.L.C.

(57) ABSTRACT

The image processor of the present invention generates a more natural synthesized image from camera images taken with a plurality of cameras capturing the surroundings of a vehicle. A parameter storage section stores a plurality of image synthesis parameter groups representing the correspondence between the camera images and the synthesized image and having different spatial or temporal resolution relations. A parameter selection section selects the image synthesis parameter group according to the output of a vehicle motion detection section for detecting the motion of the vehicle such as the driving speed and direction. An image synthesis section generates the synthesized image from the camera images according to the selected image synthesis parameter group.

9 Claims, 20 Drawing Sheets

Camera image (Camera 1)

Synthesized image

Image synthesis parameter group

FIG. 3

| Input | Output |
|---|---|
| Vehicle speed | Image synthesis parameter group |
| Less than 10 km/h | Frame base |
| 10 km/h or more | Field base |

FIG. 4

| Input | Output | |
|---|---|---|
| Vehicle speed | Image synthesis parameter group | Capture pattern |
| Less than 10 km/h | Frame base | Non-interlace, 1/30 sec. |
| 10〜30km/h | Field base | Interlace, 1/60 sec. |
| 30 km/h or more | Field base | Interlace, 1/120 sec. |

FIG. 5

| Input | | Output | |
|---|---|---|---|
| Brightness | Vehicle speed | Image synthesis parameter group | Capture pattern |
| Bright | Less than 10 km/h | Frame base | Non-interlace, 1/30 sec. |
| | 10~30km/h | Field base | Interlace, 1/60 sec. |
| | 30 km/h or more | Field base | Interlace, 1/120 sec. |
| Dark | Less than 10 km/h | Frame base | Non-interlace, 1/30 sec. |
| | 10~30km/h | Field base | Non-interlace, 1/30 sec. |
| | 30 km/h or more | Field base | Interlace, 1/60 sec. |

FIG. 6

| Input | | | Output |
|---|---|---|---|
| Selection by driver | Distance from obstacle | Vehicle speed | Image synthesis parameter group |
| Composition A | — | Less than 10 km/h | Frame base for composition A |
| | | 10 km/h or more | Field base for composition A |
| Composition B | — | Less than 5 km/h | Frame base for composition B |
| | | 5 km/h or more | Field base for composition B |
| Automatic | Less than 1 m | Less than 5 km/h | Frame base for composition B |
| | | 5~10km/h | Field base for composition B |
| | | 10 km/h or more | Field base for composition A |
| | 1 m or more | Less than 10 km/h | Frame base for composition A |
| | | 10 km/h or more | Field base for composition A |

Composition A

Composition B

FIG. 9

| Camera No. | Cut-off frequency |
|---|---|
| Camera 1 | 1/4fs |
| Camera 2 | 1/4fs |
| Camera 3 | 1/2fs |
| Camera 4 | 1/2fs |

FIG. 10

| Input | | Output | |
|---|---|---|---|
| Selection by driver | Vehicle speed | Image synthesis parameter group | Filter parameter group |
| Composition A | — | 1 | 1 |
| Composition B | — | 2 | 2 |
| Automatic | Less than 10 km/h | 1 | 1 |
| | 10 km/h or more | 2 | 2 |

Image synthesis parameter group

Filter parameter group

FIG. 13A
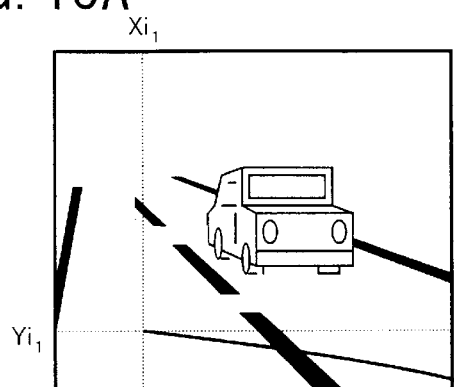
Camera 1
FIG. 13B
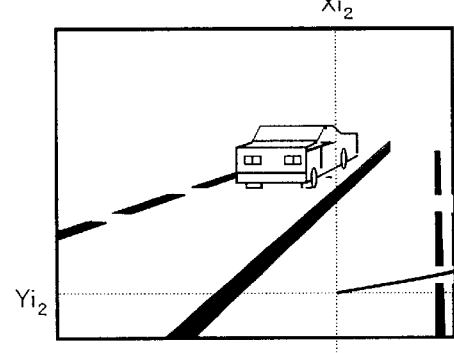
Camera 2
FIG. 13C
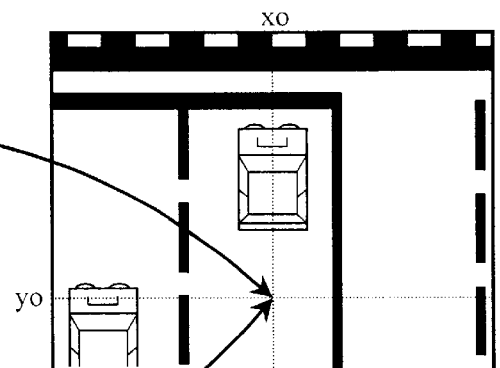
Synthesized image
FIG. 13D
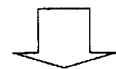
| Camera No. | X coordinate | Y coordinate | Weight |
|---|---|---|---|
| 1 | $Xi_1$ | $Yi_1$ | 0.7 |
| 2 | $Xi_2$ | $Yi_2$ | 0.3 |
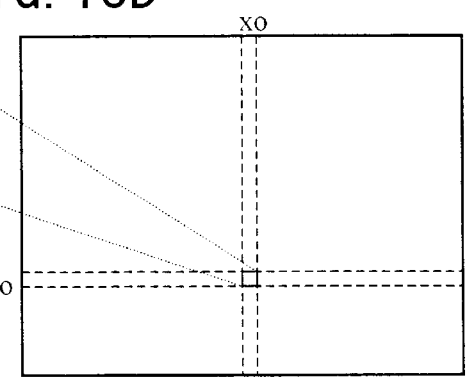
Image synthesis parameter group Coverage of camera 1
Coverage of camera 2
Overlap area
Synthesized image ⟨Overlap area data⟩

| Camera No. | X coordinate | Y coordinate | Weight |
|---|---|---|---|
| 1 | $Xi_1$ | $Yi_1$ | 0.7 |
| 2 | $Xi_2$ | $Yi_2$ | 0.3 |

Overlap area
Image synthesis parameter group

Overlapping coverage

Synthesized image

Image synthesis parameter group A

Image synthesis parameter group B

Imaging status

Case of using image synthesis parameter group A

Case of using image synthesis parameter group B

Image synthesis parameter group

| Camera No. a | X coordinate a | Y coordinate a | Camera No. b | X coordinate b | Y coordinate b | Weight reference No. |
|---|---|---|---|---|---|---|
| 1 | $Xi_1$ | $Yi_1$ | 2 | $Xi_2$ | $Yi_2$ | 3 |

| Weight reference No. | Weight | | | |
|---|---|---|---|---|
| | A | | B | |
| | Camera a | Camera b | Camera a | Camera b |
| 1 | 1.0 | 0.0 | 0.0 | 1.0 |
| 2 | 0.8 | 0.2 | 0.1 | 0.9 |
| 3 | 0.7 | 0.3 | 0.2 | 0.8 |
| ⋮ | | | | |

Image synthesis parameter group

Camera numbers at and around (xo, yo)

Image synthesis parameter group A

Image synthesis parameter group B

Input image when a vehicle is moving (Camera 3)

Synthesized image per frame (the vehicle is moving)

Synthesized image per field (the vehicle is standing still)
(Example 1 of prior art problems)

Junctures of images appear
unnatural due to difference
in brightness and tint
with cameras Nonmatching in brightness and tint Displacement of images
(Example 2 of prior art problems)

IMAGE PROCESSOR AND MONITORING SYSTEM

BACKGROUND OF THE INVENTION

The present invention relates to an image processing technique for generating a synthesized image from images taken with a plurality of cameras. In particular, the present invention relates to a technique that can be effectively applied to monitoring systems used as an assist in ensuring safety driving of a vehicle and the like.

In recent years, with widespread use of car-mounted displays and cost reduction in video equipment such as cameras, devices for monitoring the surroundings of a vehicle with cameras to assist safety driving have been commercialized and are now becoming popular.

As an example of such conventional vehicle surroundings monitoring devices, the following construction is known. That is, a camera is placed at a position on a vehicle where an image of a blind area for the driver, such as the rear of the vehicle, can be taken with the camera, and the image taken (camera image) is shown on a display for monitoring.

For example, Japanese Laid-Open Patent Publication No. 58-110334 discloses the following construction. A plurality of cameras are placed at different positions on a vehicle. A plurality of camera images taken with the cameras are modified and synthesized, to generate a synthesized image as is viewed from the above of the vehicle with the vehicle in the center and display the synthesized image on an in-car display. Using this vehicle surroundings monitoring device, the driver sitting on the driver's seat can monitor on the display a blind area of which direct view is not possible. This contributes to avoiding an accident that would otherwise have occurred, and also facilitating the driving.

[Problems to be Solved]

However, the inventors of the present invention have found from experiments and examinations that the conventional construction has the following problems.

FIGS. 22A to 22C illustrate examples of image synthesis performed when a vehicle is moving. In the case of using cameras for interlaced scanning, an input image as shown in FIG. 22A is obtained when the vehicle is moving. That is, every other horizontal line is displaced resulting in comb-shaped appearance. This input image is not particularly strange as long as it is displayed as it is on a display for interlaced scanning. However, when this input image is modified for synthesis, the comb-shaped displacement is also modified during the image modification as shown in FIG. 22B, and this causes a lag between the image-taking timing and the displaying timing. The resultant image makes the observer feel strange. That is, so-called interlace noise appears on the synthesized image more significantly.

The unnaturalness as described above does not appear when a one-field synthesized image is generated from one-field input images. However, the resolution of an input image is low in this per-field synthesis, compared with per-frame synthesis. Therefore, when an image of two fields is observed as a frame image as shown in FIG. 22C, comb-shaped displacement occurs due to an error in quantization of coordinate values even when the image is still. This deteriorates the image quality, especially in the area of a synthesized image where an input image has been enlarged, when the vehicle is standing still.

That is, as the first problem, when a one-frame synthesized image is generated from one-frame (two-field) input images, the synthesized image is unnatural when the vehicle is moving and when a moving image is taken. When a one-field synthesized image is generated from one-field input images, the resolution of the synthesized image is low.

As the second problem, in modification of a camera image, the input image may be contracted depending on the composition of a synthesized image. As a result, aliasing distortion may partially be generated in the synthesized image.

As the third problem, the junctures of input images on a synthesized image may be unnatural. For example, because white balancing and the like are adjusted separately for the respective cameras, the brightness and the tint may fail to match at the junctures as shown in FIG. 23A. Also, in some image synthesis methods, the junctures of images may be displaced due to calculation error, erroneous detection of the position of an object, and the like, as shown in FIG. 23B.

SUMMARY OF THE INVENTION

An object of the present invention is providing an image processor for generating a synthesized image from a plurality of camera images, which can generate a more natural synthesized image compared with the conventional processors.

Specifically, the image processor of the present invention, which receives camera images taken with a plurality of cameras capturing the surroundings of a vehicle and generates a synthesized image from the camera images, includes a parameter generation section constructed to be able to generate a plurality of image synthesis parameter groups each representing the correspondence between the camera images and the synthesized image and having different spatial or temporal resolution relations, wherein the synthesized image is generated from the camera images according to the image synthesis parameter group generated by the parameter generation section, and the parameter generation section switches the image synthesis parameter group to be generated according to an output of a vehicle motion detection section for detecting the motion of the vehicle.

According to the invention described above, it is possible to switch the image synthesis parameter group used for generation of a synthesized image according to the motion of the vehicle. This makes it possible to reduce the unnaturalness of the synthesized image observed when the vehicle is moving and when an image of a moving object is taken, and also prevent the reduction in resolution observed when the vehicle is standing still.

In the image processor of the present invention, the parameter generation section preferably includes: a parameter storage section for storing the plurality of image synthesis parameter groups; and a parameter selection section for selecting at least one among the plurality of image synthesis parameter groups stored in the parameter storage section according to the output of the vehicle motion detection section.

In the image processor of the present invention, preferably, the camera images are interlaced images, and the plurality of image synthesis parameter groups include at least a frame-base image synthesis parameter group and a field-base image synthesis parameter group. Preferably, the parameter generation section generates the field-base image synthesis parameter group when the motion of the vehicle detected by the vehicle motion detection section is relatively fast, and generates the frame-base image synthesis parameter group when the motion of the vehicle is relatively slow.

In the image processor of the present invention, the vehicle motion detection section preferably detects the motion of the vehicle from the camera images.

In the image processor of the present invention, preferably, the plurality of cameras are constructed to be able to switch a capture pattern according to an input switch signal, and the parameter generation section sends the switch signal to the cameras, together with generating the image synthesis parameter group, according to the output of the vehicle motion detection section, to switch the capture patterns of the cameras. Preferably, the parameter generation section selects the image synthesis parameter group and switches the capture patterns of the cameras according to an output of a vehicle status detection section for detecting brightness of the surroundings of the vehicle, in addition to the output of the vehicle motion detection section.

In the image processor of the present invention, preferably, the parameter generation section generates the image synthesis parameter group according to an output of a vehicle status detection section for detecting the vehicle status such as an operation by a driver of the vehicle or whether or not an obstacle exists in the surroundings of the vehicle, in addition to the output of the vehicle motion detection section.

The monitoring system of the present invention includes the image processor described above as an image processing section.

Alternatively, the image processor of the present invention, which receives camera images taken with a plurality of cameras capturing the surroundings of a vehicle and generates a synthesized image from the camera images, includes: a parameter storage section for storing a plurality of sets of an image synthesis parameter group representing the correspondence between the camera images and the synthesized image and a filter parameter group corresponding to the image synthesis parameter group; a parameter selection section for selecting at least one among the plurality of sets of the image synthesis parameter group and the filter parameter group stored by the parameter storage section according to an output of a vehicle motion detection section for detecting the motion of the vehicle and an output of a vehicle status detection section for detecting the status of the vehicle such as an operation by a driver of the vehicle or whether or not an obstacle exists in the surroundings of the vehicle; and a filtering section for performing frequency band limitation filtering for the camera images according to the filter parameter group of the set selected by the parameter selection section, wherein the synthesized image is generated from the camera images filtered by the filtering section according to the image synthesis parameter group of the set selected by the parameter selection section.

According to the invention described above, the filter parameter group is selected according to the motion and status of the vehicle, and the camera images are subjected to frequency band limitation filtering according to the selected filter parameter group. This effectively suppresses the aliasing distortion in the synthesized image.

In the image processor of the present invention described above, the filter parameter group preferably includes filtering setting data for each pixel position of the camera image.

The monitoring system of the present invention includes the image processor described above as an image processing section.

Alternatively, the image processor of the present invention, which receives camera images taken with a plurality of cameras capturing the surroundings of a vehicle and generates a synthesized image from the camera images, includes: a brightness correction parameter calculation section for calculating brightness correction parameters for correcting the brightness and tint of the camera images; and a brightness correction section for correcting the brightness and tint of the camera images using the brightness correction parameters calculated by the brightness correction parameter calculation section, wherein the synthesized image is generated from the plurality of camera images subjected to brightness correction by the brightness correction section according to an image synthesis parameter group representing the correspondence between the camera images and the synthesized image, the image synthesis parameter group includes overlap area data for an overlap area on the synthesized image in which coverages of the plurality of cameras overlap, the overlap area data indicating coordinates of pixels in camera images corresponding to the overlap area, and the brightness correction parameter calculation section receives the overlap area data and calculates the brightness correction parameters using brightness and tint data for the pixels in the camera images corresponding to the overlap area indicated by the overlap area data.

According to the invention described above, brightness correction parameters are calculated using information on the brightness and tint of the camera images corresponding to the overlap area on the synthesized image, and brightness correction is performed using the brightness correction parameters. This reduces the unnaturalness of the juncture on the synthesized image.

In the image processor of the present invention described above, preferably, the brightness correction parameter calculation section performs statistical processing on the brightness in the overlap area for the camera images corresponding to the overlap area, and calculates the brightness correction parameters based on the processing results.

In the image processor of the present invention described above, when a plurality of overlap areas exist, the brightness correction parameter calculation section preferably sets priorities to the overlap areas to be considered during the calculation of the brightness correction parameters according to an output of a vehicle motion detection section for detecting the motion of the vehicle.

In the image processor of the present invention described above, the brightness correction section is preferably incorporated in the cameras.

The monitoring system of the present invention includes the image processor described above as an image processing section.

Alternatively, the image processor of the present invention receives camera images taken with a plurality of cameras capturing the surroundings of a vehicle and generates a synthesized image from the camera images, wherein, in an overlap area in which coverages of a plurality of cameras overlap on the synthesized image, a camera image used for generation of the synthesized image is selected among camera images from the plurality of cameras according to an output of a vehicle motion detection section for detecting the motion of the vehicle or an output of a vehicle status detection section for detecting the status of the vehicle such as an operation by a driver of the vehicle or whether or not an obstacle exists in the surroundings of the vehicle.

Alternatively, the image processor of the present invention receives camera images taken with a plurality of cameras capturing the surroundings of a vehicle and generates a synthesized image from the camera images, wherein, in an overlap area in which coverages of a plurality of cameras overlap on the synthesized image, weights to camera images from the plurality of cameras are set according to an output of a vehicle motion detection section for detecting the motion of the vehicle or an output of a vehicle status detection section for detecting the status of the vehicle such as an operation by a driver of the vehicle or whether or not an obstacle exists in the surroundings of the vehicle.

In the image processor of the present invention described above, the processor includes: an image synthesis parameter group associating pixels in the synthesized image with pixels in the camera images; and a table representing the correspondence between a weight reference number and a combination of sets of weighting information, wherein a portion of the image synthesis parameter group corresponding to the overlap area holds any of the weight reference numbers shown in the table.

The monitoring system of the present invention includes the image processor described above as an image processing section.

Alternatively, the image processor of the present invention receives camera images taken with a plurality of cameras capturing the surroundings of a vehicle and generating a synthesized image from the camera images, wherein the image processor includes an image synthesis parameter group associating pixels in the synthesized image with pixels in the camera images, and in an overlap area in which coverages of the plurality of cameras overlap on the synthesized image, the image synthesis parameter group includes weights set to camera images from the plurality of cameras represented by a dithering method.

BRIEF DESCRIPTION OF THE DRAWINGS

FIG. 3 shows an example of selection of image synthesis parameter groups in EMBODIMENT 1 of the present invention.

FIG. 4 shows an example of selection of image synthesis parameter groups and capture patterns in EMBODIMENT 1 of the present invention.

FIG. 5 shows an example of selection of image synthesis parameter groups and capture patterns in the case of using an output of a brightness detection means in EMBODIMENT 1 of the present invention.

FIG. 6 shows an example of selection of image synthesis parameter groups in the case of using outputs of a switch detection means and an obstacle detection means in EMBODIMENT 1 of the present invention.

FIG. 9 is a view showing a filter parameter group.

FIG. 10 shows an example of selection of image synthesis parameter groups and filter parameter groups in EMBODIMENT 2 of the present invention.

FIGS. 13A to 13D are views showing an image synthesis parameter group for generating a synthesized image from a plurality of camera images.

DESCRIPTION OF THE PREFERRED EMBODIMENTS

Hereinafter, preferred embodiments of the present invention will be described with reference to the accompanying drawings.

Embodiment 1

Figure 1:
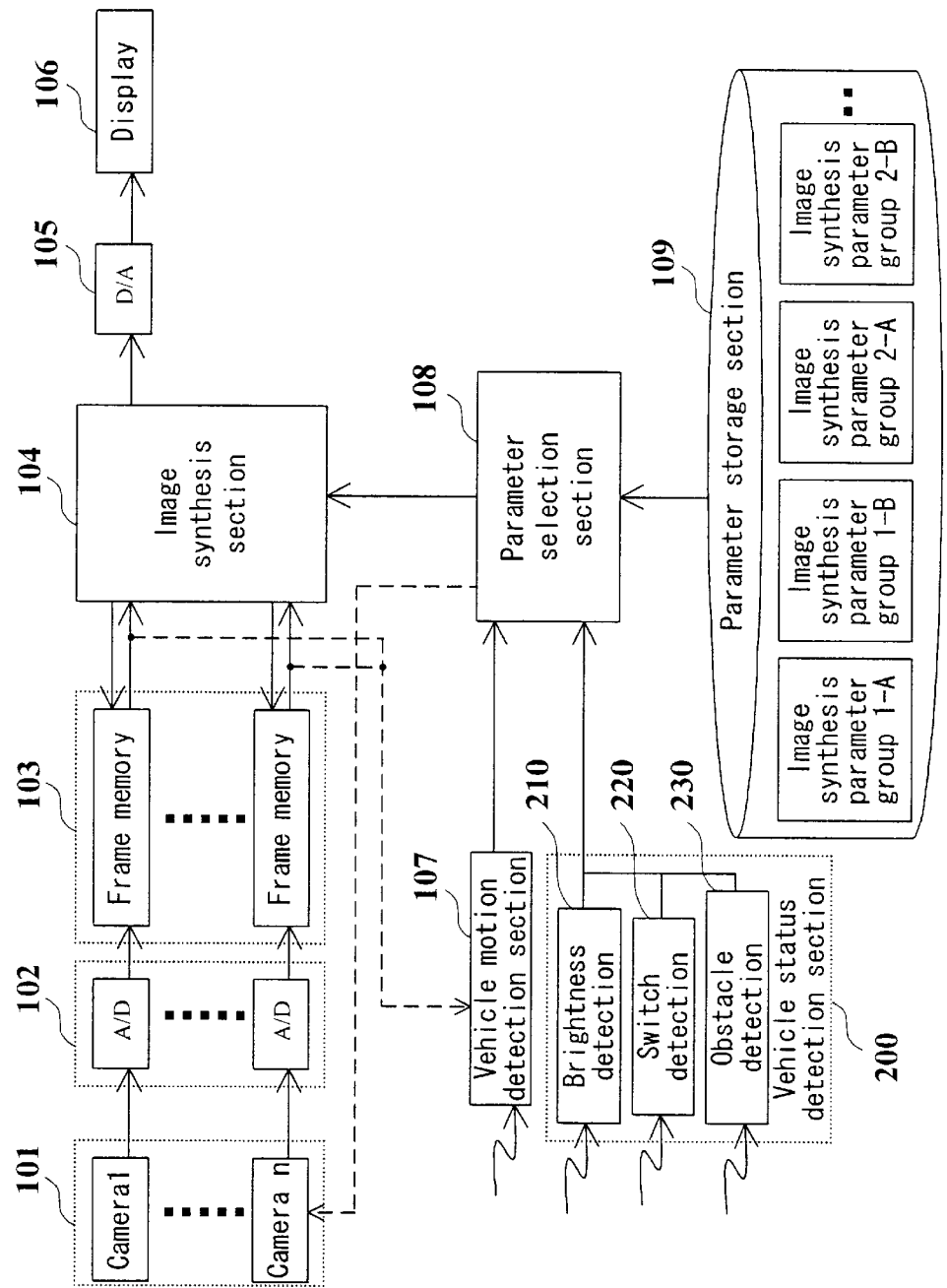
FIG. 1 is a structural view of a vehicle surroundings monitoring system of EMBODIMENT 1 of the present invention.

FIG. 1 illustrates a construction of a vehicle surroundings monitoring system of EMBODIMENT 1 of the present invention. Referring to FIG. 1, cameras 101 take images, A/D converters 102 digitalize analog image signals, and frame memories 103 temporarily hold the digitalized input images. Each of the frame memories 103 have a so-called double-buffer structure, which temporarily holds immediately preceding one-frame image data while continuing to store the images output from the camera 1. In other words, the frame memories 103 are constructed to permit read of arbitrary pixel data in the immediately preceding one-frame image in response to a read request from an image synthesis section 104.

A vehicle motion detection section 107 detects motion of a vehicle. A parameter storage section 109 stores in advance a plurality of image synthesis parameter groups representing the correspondence between camera images and a synthesized image. A parameter selection section 108 selects one of the plurality of image synthesis parameter groups stored in the parameter storage section 109 according to the motion of the vehicle detected by the vehicle motion detection section 107.

The image synthesis section 104 sequentially reads images from the frame memories 103 according to the image synthesis parameter group selected by the parameter selection section 108 to combine the images and output a synthesized image. A D/A converter 105 converts the synthesized image to analog signals, and a display 106 displays the analog-converted synthesized image.

The A/D converters 102, the frame memories 103, the image synthesis section 104, the D/A converter 105, the parameter selection section 108, and the parameter storage section 109 constitute an image processor or an image processing section. The parameter selection section 108 and the parameter storage section 109 constitute a parameter generation section.

In this embodiment, assume that images handled by the cameras 101 and the display 106 are interlaced scanning images. Also assume that the vehicle motion detection section 107 detects the rotational speed of the wheels of the vehicle, the driving direction, and the like as the motion of the vehicle, from signals sent from sensors placed on an axle of a wheel, the shift lever, and the like.

The system also includes a vehicle status detection section 200, which will be described later together with the usage thereof.

Hereinafter, the operation of the vehicle surroundings monitoring system with the above construction will be described.

Figure 2A:
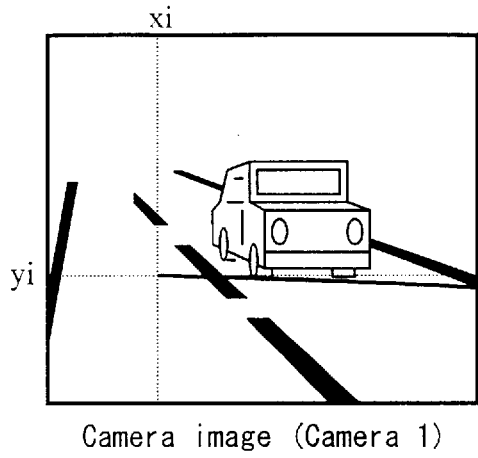
FIGS. 2A to 2C are views for description of image synthesis using an image synthesis parameter group.
Figure 2B:
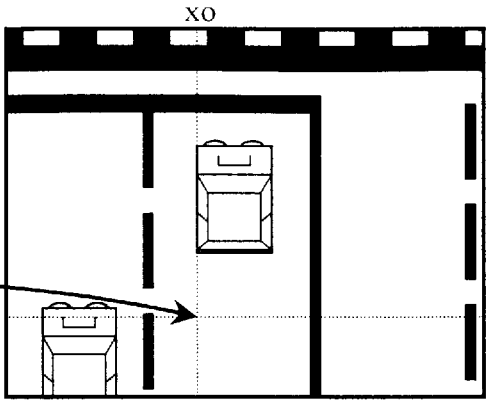
Figure 2C:
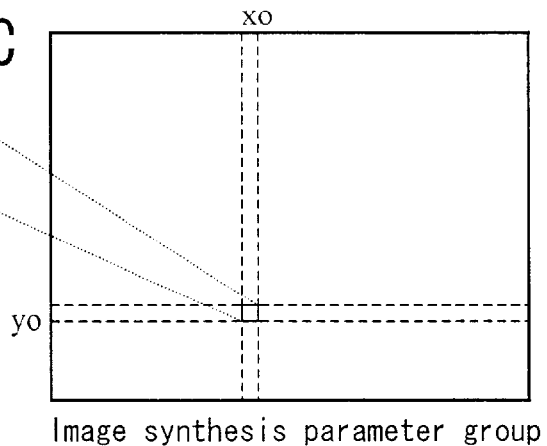
Figure 15:
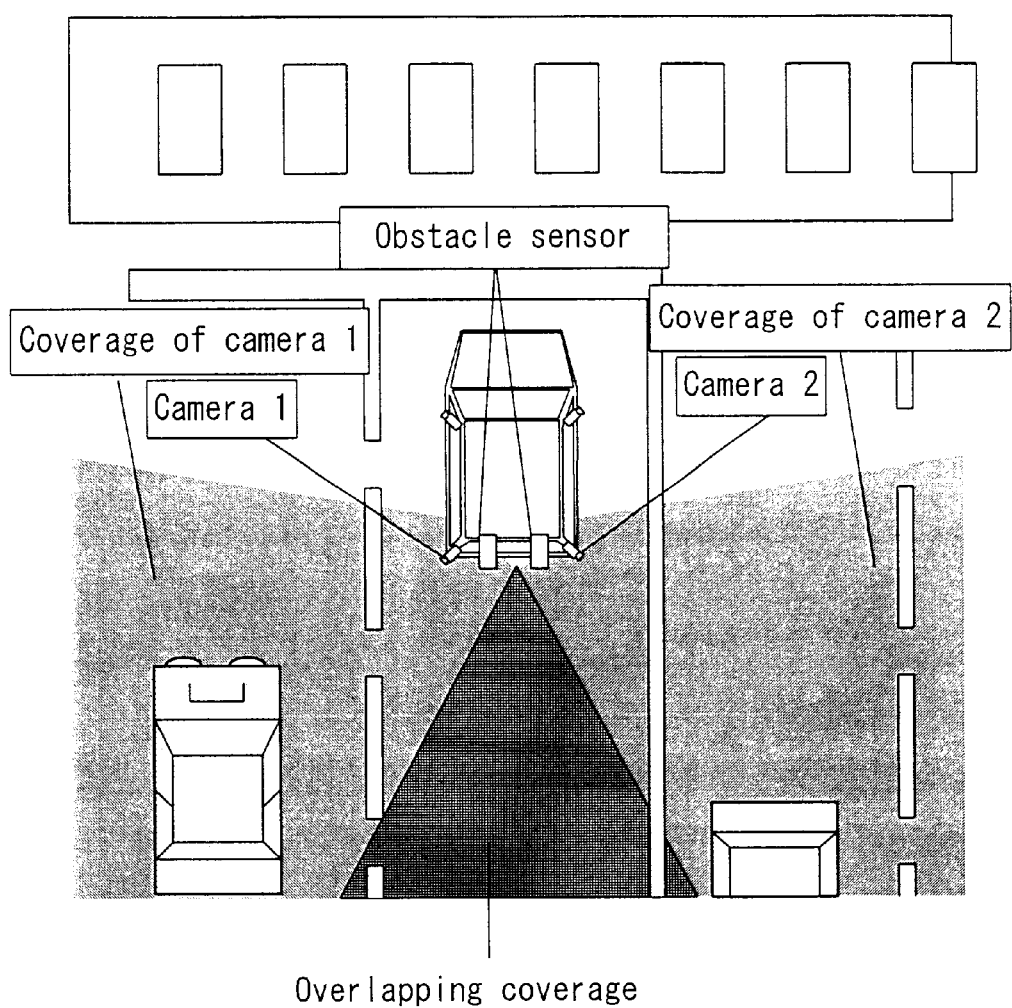
FIG. 15 is a view showing the positions at which cameras and obstacle sensors are placed in EMBODIMENT 4 of the present invention.

FIGS. 2A to 2C illustrate how to combine images using an image synthesis parameter group. FIG. 2A illustrates an example of a camera image that is a one-frame image from a camera 1 placed as shown in FIG. 15. FIG. 2B illustrates an example of a one-frame synthesized image obtained by modifying and combining four camera images.

FIG. 2C is an example of an image synthesis parameter group, in which respective sets of coordinates have one-to-one correspondence with the coordinates of pixels in the synthesized image. Each set of coordinates includes parameters representing the camera number with which a camera image is taken and a two-dimensional array indicating the coordinates of a pixel in the camera image used to generate the pixel in the synthesized image corresponding to the set of coordinates. In the example shown in FIG. 2C, information of "camera No. 1, coordinates (xi, yi)" is stored in the coordinates (xo, yo) in the image synthesis parameter group. This indicates that the pixel at the coordinates (xo, yo) in the synthesized image is generated by the pixel at the coordinates (xi, yi) in the camera image from the camera 1. In this way, it is possible to describe the correspondence between the pixels in a plurality of camera images and those in a synthesized image by use of an image synthesis parameter group constructed as shown in FIG. 2C.

In this embodiment, it is assumed that the parameter storage section 109 stores a plurality of image synthesis parameter groups having different spatial or temporal resolutions for at least either the camera images or the synthesized image.

As such a plurality of image synthesis parameter groups having different spatial or temporal resolutions, assume specifically that the parameter storage section 109 stores a frame-base image synthesis parameter group and a field-base image synthesis parameter group having the same composition of the synthesized image. In the frame-base image synthesis parameter group, a one-frame camera image corresponds to a one-frame synthesized image. In the field-base image synthesis parameter group, the first field of a camera image corresponds to one field of a synthesized image, while the second field of the camera image corresponds to the other field of the synthesized image. The field-to-field correspondence between the camera image and the synthesized image can be easily described by imposing a restriction that the part of a camera image having an even y coordinate value corresponds to the part of a synthesized image having an even y coordinate value and that the part of the camera image having an odd y coordinate value corresponds to the part of the synthesized image having an odd y coordinate value.

FIG. 3 shows an example of the operation of the parameter selection section 108. Referring to FIG. 3, the parameter selection section 108 selects the image synthesis parameter group according to the vehicle speed detected by the vehicle motion detection section 107 based on predetermined criteria. Specifically, the parameter selection section 108 selects the frame-base image synthesis parameter group when the motion of the vehicle is relatively slow, for example, when the vehicle speed is less than 10 km/h, and selects the field-base image synthesis parameter group when the motion of the vehicle is relatively fast, for example, when the vehicle speed is 10 km/h or more. The image synthesis section 104 reads pixel data of camera images from the frame memories 103 according to the camera numbers and the coordinate values in the image synthesis parameter group selected by the parameter selection section 108, to generate a synthesized image. The generated synthesized image is converted to analog signals by the D/A converter 105 and displayed on the display 106.

By the operation as described above, images are combined every field when the vehicle speed is high and the motion in the camera image is large. This enables generation of a natural synthesized image free from comb-shaped displacement. On the contrary, images are composed every frame when the vehicle speed is low. This enables generation of a clear synthesized image with high resolution. That is, by changing the image synthesis method according to the motion of the vehicle, it is possible to reduce the unnaturalness of the synthesized image that is otherwise observed when the vehicle is moving, and also prevent the reduction in the resolution of the synthesized image that is otherwise observed when the vehicle is substantially standing still.

In this embodiment, the vehicle motion detection section 107 detects the motion of the vehicle, represented by the rotational speed of the wheels, the driving direction, and the like, from signals sent from sensors placed on an axle, the shift lever, and the like. Alternatively, the vehicle motion may be detected from camera images.

In the case of detecting the vehicle motion from camera images, images from one of the cameras 101 are sequentially read from the frame memory 103, to obtain an image composed of a plurality of temporally continuous frames or fields and calculate a motion vector in the image. Based on the calculated motion vector and camera parameters such as the pre-measured position, direction, and focal distance of the camera 101, the direction and speed of the motion of the road surface in the image are determined and output as the vehicle speed.

By providing the vehicle motion detection section 107 that detects the vehicle motion from camera images as described above, it is no more required to supply inputs other than the images, such as the signals from sensors placed on an axle and the shift lever. Therefore, a simple system construction can be realized.

The cameras 101 may have a function of switching a capture pattern according to an input switch signal. In such a case, the parameter selection section 108 may be constructed to switch the capture pattern of the cameras 101, in addition to selecting the image synthesis parameter group as described above, according to the vehicle motion detected by the vehicle motion detection section 107.

FIG. 4 is a view showing an example of the operation of the parameter selection section 108 in the case described above. In this example, it is assumed that the cameras 101 permit switching between interlaced imaging (one field every $1/60$ second) and non-interlaced imaging (one frame every $1/30$ second) and switching of the shutter speed (exposure time: $1/30$ second, $1/60$ second, and $1/120$ second).

As shown in FIG. 4, the parameter selection section 108 selects the image synthesis parameter group according to the vehicle speed detected by the vehicle motion detection section 107 based on predetermined criteria, and also switches the capture pattern of each camera 101. Specifically, the parameter selection section 108 selects the frame-base image synthesis parameter group when the vehicle speed is less than 10 km/h, or the field-base image synthesis parameter group when it is 10 km/h or more. In addition, the parameter selection section 108 switches the capture pattern of each camera 101 so that non-interlaced imaging and $\frac{1}{30}$-second exposure time are selected when the vehicle speed is less than 10 km/h, interlaced imaging and $\frac{1}{60}$-second exposure time are selected when the vehicle speed is between 10 km/h or more and less than 30 km/h, and interlaced imaging and $\frac{1}{120}$-second exposure time are selected when the vehicle speed is 30 km/h or more.

By the operation described above, when the vehicle speed is less than 10 km/h, images are taken by non-interlaced imaging and combined per frame. This increases the resolution of the synthesized image. When the vehicle speed is 10 km/h or more, images are taken by interlaced imaging and combined per field. This decreases the resolution, but natural motion is obtained. In addition, by switching the exposure time with the vehicle speed, a natural synthesized image with reduction in blurring due to the motion is obtained. In other words, a synthesized image with optimum quality determined by the motion of the vehicle can be generated by the combination of the selection of the image synthesis parameter group and the switching of the capture pattern.

The construction shown in FIG. 1 includes the vehicle status detection section 200. The outputs of the vehicle status detection section 200 can be used in the selection of the image synthesis parameter group and the switching of the capture pattern, to further improve the quality of the synthesized image. The vehicle status detection section 200, which is constructed of an optical sensor placed on the vehicle and the like, includes a means 210 for detecting the brightness in the surroundings of the vehicle, a means 220 for detecting the switching operation by the driver, and a means 230 for detecting an obstacle in the surroundings of the vehicle.

FIG. 5 is a view showing an example of the operation of the parameter selection section 108 using the output of the brightness detection means 210. In general, the exposure time required to take one-frame image by interlaced imaging is half that required by non-interlaced imaging. In the case of a moving image, a longer exposure time causes blurring but provides a bright image. On the contrary, a shorter exposure time reduces blurring but darkens the image. Based on this fact, the parameter selection section 108 performs the selection of the image synthesis parameter group and the switching of the capture pattern of each camera 101 in consideration of the brightness in the surroundings of the vehicle detected by the brightness detection means 210, in addition to the vehicle speed detected by the vehicle detection section 107. This enables generation of a synthesized image with optimum quality determined by the brightness in the surroundings of the vehicle and the vehicle speed.

FIG. 6 is a view showing an example of the operation of the parameter selection section 108 using the outputs of the switch detection means 220 and the obstacle detection means 230. Assume that the parameter storage section 109 stores frame-base and field-base image synthesis parameter groups for two types of compositions shown in FIGS. 7A and 7B, and that the driver is allowed to select one of three options, "composition A", "composition B", and "automatic", by switch operation. The switch detection means 220 detects the switch operation by the driver. The obstacle detection means 230 measures the distance from an obstacle using an ultrasonic obstacle sensor placed on the vehicle and outputs the results.

The parameter selection section 108 selects a suitable image synthesis parameter group according to the detected status of the vehicle, that is, the selection by the driver and the distance from an obstacle, and the vehicle speed detected by the vehicle motion detection section 107.

Figure 7A:
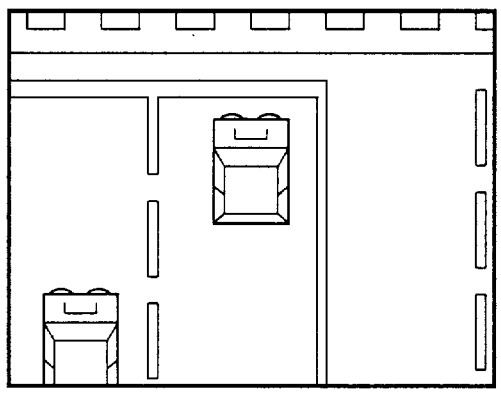
FIGS. 7A and 7B show exemplary compositions of a synthesized image.
Figure 7B:
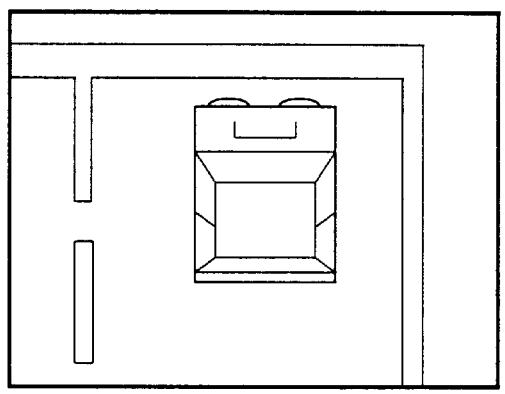

Composition A of FIG. 7A includes a wider range of the surroundings of the vehicle, while composition B of FIG. 7B shows a narrower range of the surroundings of the vehicle in an enlarged view. Therefore, supposing the vehicle speed is the same, greater comb-shaped displacement is generated in composition B than in composition A. In view of this fact, the vehicle speed with which the image synthesis parameter group is switched from the frame base to the field base may be changed according to the motion and status of the vehicle, as shown in FIG. 6. This enables generation of a synthesized image with further optimum quality.

The vehicle status detection section 200 may also detect the operations of the shift lever, the winker, and the like by the driver.

In this embodiment, the field-base and frame-base image synthesis parameter groups were used as an example. It is also possible to use other types of image synthesis parameter groups that are different in spatial or temporal resolution relation from each other. For example, when a one-frame camera image is constructed of a plurality of images taken for different durations, it is possible to use a plurality of image synthesis parameter groups having different spatial or temporal resolution combinations, to provide substantially the same effects as those described above.

It should be noted that the criteria for selection of a parameter group shown in FIGS. 3 to 6 and 10 are mere examples and that a parameter group may be selected according to the motion and status of the vehicle based on criteria other than the exemplified ones.

In this embodiment, field-base and frame-base image synthesis parameter groups were prepared. Alternatively, only a frame-base image synthesis group may be prepared to realize the operation described above. That is, a field-base image synthesis parameter group can be prepared by rounding the y coordinate value yi in a camera image to an odd or even number according to the field to which the y coordinate value yo in the frame-base image synthesis parameter group belongs. Therefore, only a frame-base image synthesis parameter group may be stored in the parameter storage section 109. When a frame-base image synthesis parameter group is required, the parameter selection section 108 reads the frame-base image synthesis parameter group as it is. When a field-base image synthesis parameter group is required, the parameter selection section 108 may convert the frame-base image synthesis parameter group stored in the parameter storage section 109 to a field-base image synthesis parameter group in the manner described above.

Embodiment 2

Figure 8:
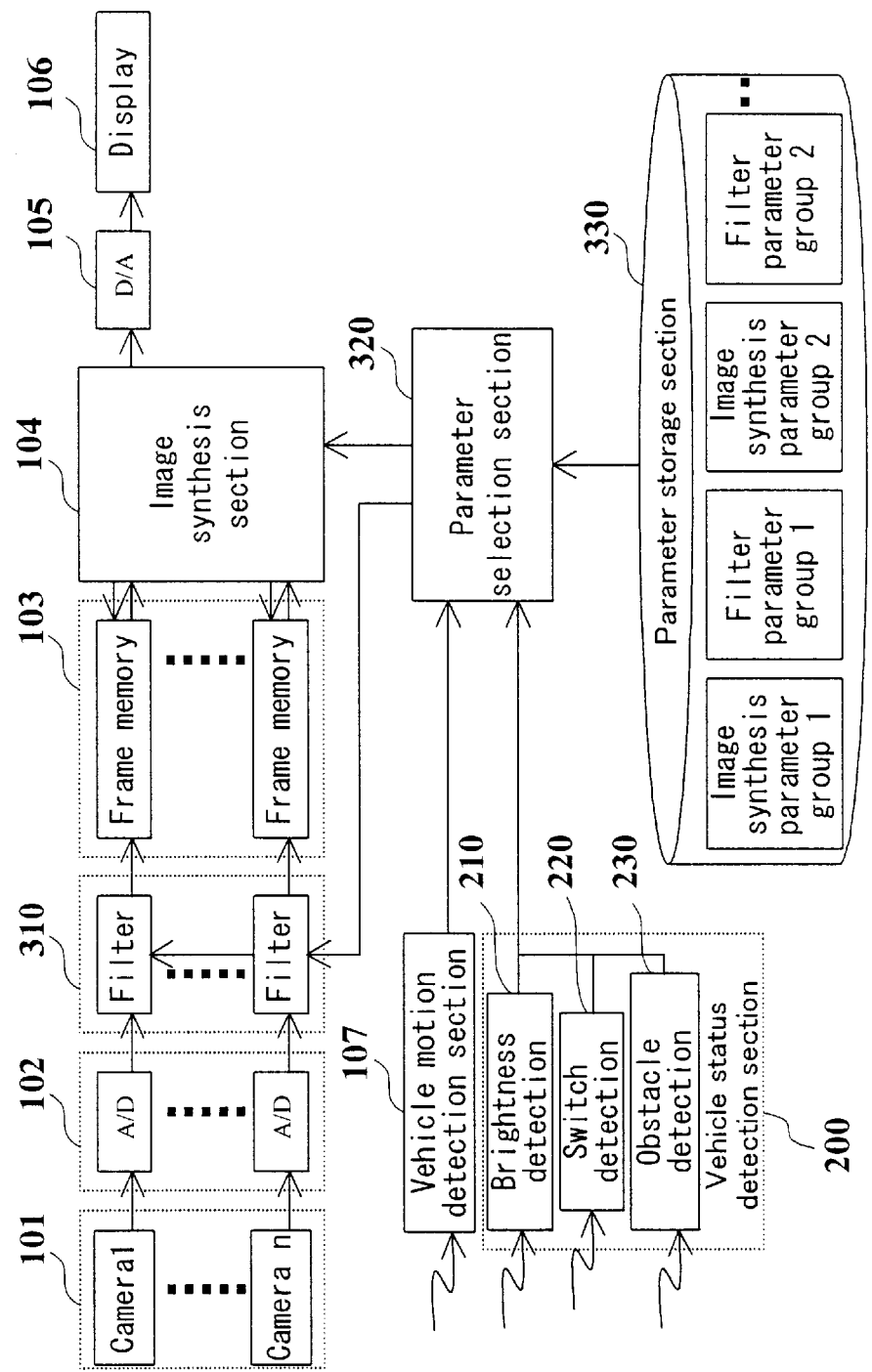
FIG. 8 is a structural view of a vehicle surroundings monitoring system of EMBODIMENT 2 of the present invention.

FIG. 8 illustrates a construction of a vehicle surroundings monitoring system of EMBODIMENT 2 of the present invention. This construction is different from the construction shown in FIG. 1 in that a filtering section 310 is provided between the A/D converters 102 and the frame memories 103 to perform filtering of camera images. A parameter storage section 330 stores a plurality of sets of an image synthesis parameter group representing the correspondence between camera images and a synthesized image and a filter parameter group corresponding to the image synthesis parameter group. A parameter selection section 320 selects a set of the image synthesis parameter group and the filter parameter group from the parameter storage section 330 according to the vehicle motion detected by the vehicle motion detection section 107 and the vehicle status detected by the vehicle status detection section 200. The filtering section 310 performs frequency-band limitation filtering for respective camera images according to the filter parameter group in the set selected by the parameter selection section 320.

FIG. 9 shows an example of the filter parameter group, which specifies the cut-off frequency for each camera. The filtering section 310 performs low-pass filtering with the cut-off frequency specified in the filter parameter group for digitized image data output from the A/D converters 102.

In the illustrated example, the cut-off frequency is provided for a pixel clock fs, and "½ fs" is specified when the input image data is to be output as it is and "¼ fs" is specified when the input image data is to be filtered with a cut-off frequency of ¼ fs. The cut-off frequency is calculated in advance based on a sampling theorem according to the contraction rate of the portion of the camera image that is most contracted during image synthesis according to the image synthesis parameter group. For example, when the contraction rate of the portion of a camera image from the camera 1 that is most contracted during image synthesis is ½ in terms of the length, the cut-off frequency for the camera 1 is set at ¼ fs.

The contraction rate of a camera image can be determined using the coordinate values for the camera image in an image synthesis parameter group. For example, assume that the parameter element at coordinates (x0, y0) in an image synthesis parameter group includes "camera No. 1, coordinates (x1, y1)", and the parameter element at coordinates (x0+1, y0) in the image synthesis parameter group includes "camera No. 1, coordinates (x2, y2)". In this case, when the distance between the coordinates (x1, y1) and the coordinates (x2, y2) is D, the portions at and around the coordinates (x1, y1) and the coordinates (x2, y2) in the camera image from the camera 1 have been contracted to 1/D in the synthesized image. In this way, it is possible to obtain the contraction rates at and around certain pixels in a camera image. The minimum of the thus-obtained contraction rates is the contraction rate of the most contracted portion of the camera image.

The parameter selection section 320 selects the image synthesis parameter group and the filter parameter group according to the vehicle speed detected by the vehicle motion detection section 107 and the vehicle status detected by the vehicle status detection section 200 as shown in FIG. 10, for example. The other operation is substantially the same as that described in EMBODIMENT 1.

As described in relation to the problems to be solved, when an image is contracted in modification, aliasing distortion may be generated in a synthesized image unless a high-range frequency component is removed according to the contraction rate. In this embodiment, such aliasing distortion can be eliminated by performing the low-pass filtering according to the filter parameter group. Moreover, in the case of switching the composition of a synthesized image as shown in FIG. 7, the filter parameter group may be switched together with the switching of the composition. This enables generation of a synthesized image with optimum quality with reduced aliasing distortion determined by the status and speed of the vehicle.

Figure 11A:
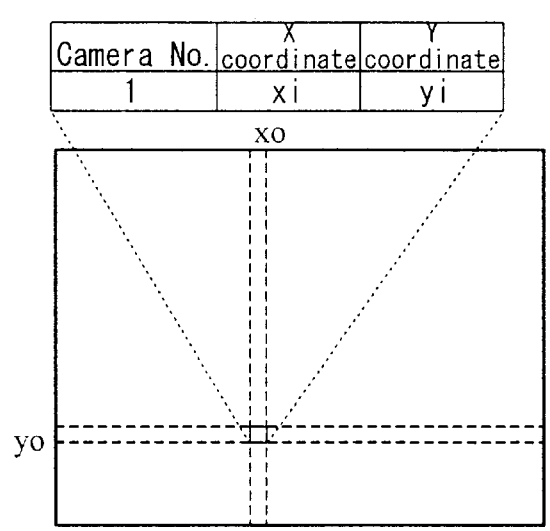
FIGS. 11A and 11B are views showing filter parameter groups.
Figure 11B:
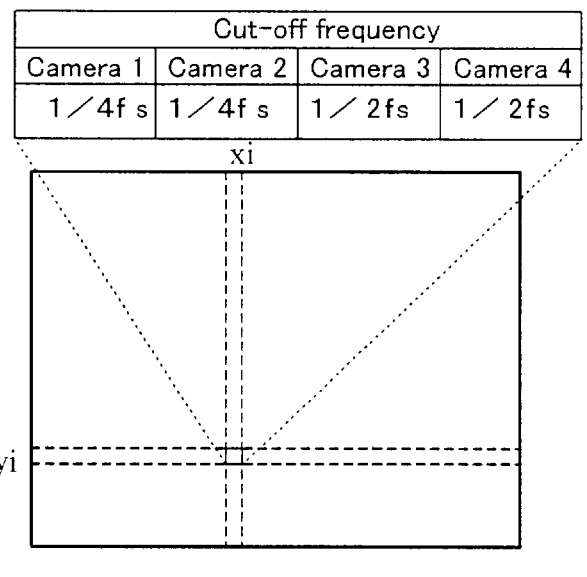

FIGS. 11A and 11B are views for description of another example of the filter parameter group. The filter parameter group shown in FIG. 11B includes parameter elements having one-to-one correspondence with the coordinates of pixels in a one-frame camera image. Each parameter element specifies the cut-off frequency for filtering of each camera image. In other words, the filter parameter group includes filtering setting data for respective pixel positions of each camera image.

The parameter selection section 320 selects the image synthesis parameter group and the filter parameter group according to the vehicle speed detected by the vehicle detection section 107 and the vehicle status detected by the vehicle status detection section 200, and outputs the selected results while performing sequential scanning. The filtering section 310 performs low-pass filtering for the digitized image data output from the A/D converters 102 according to the cut-off frequency information in the filter parameter group output from the parameter selection section 320.

In the filter parameter group shown in FIG. 9, only one cut-off frequency is provided for one camera image. This is not necessarily suitable when the contraction rate varies with the positions on a camera image in the image synthesis. On the contrary, in the filter parameter group shown in FIG. 11B, the cut-off frequency can be changed with the positions on a camera image, and thus the non-contracted portion of the input image is prevented from blurring.

The filter parameter group shown in FIG. 11B includes filtering setting data having one-to-one correspondence with the coordinates of pixels in a one-frame camera image. In general, filter parameters of adjacent pixels tend to have similar values. Therefore, common setting data may be held for a plurality of adjacent pixels. For example, common setting data may be held every rectangular area of 8×8 pixels. By this setting, in addition to preventing the non-contracted portion of the image from blurring, the data amount of the filter parameter group can be reduced compared with the case of holding filtering setting data every pixel.

A more significant effect can be provided by combining the constructions of EMBODIMENT 1 and EMBODIMENT 2. That is, the interlace noise can be eliminated by the technical feature of EMBODIMENT 1 and the aliasing distortion can be eliminated by the technical feature of EMBODIMENT 1. This enables generation of a synthesized image with good quality even when the vehicle is moving at high speed.

Embodiment 3

Figure 12:
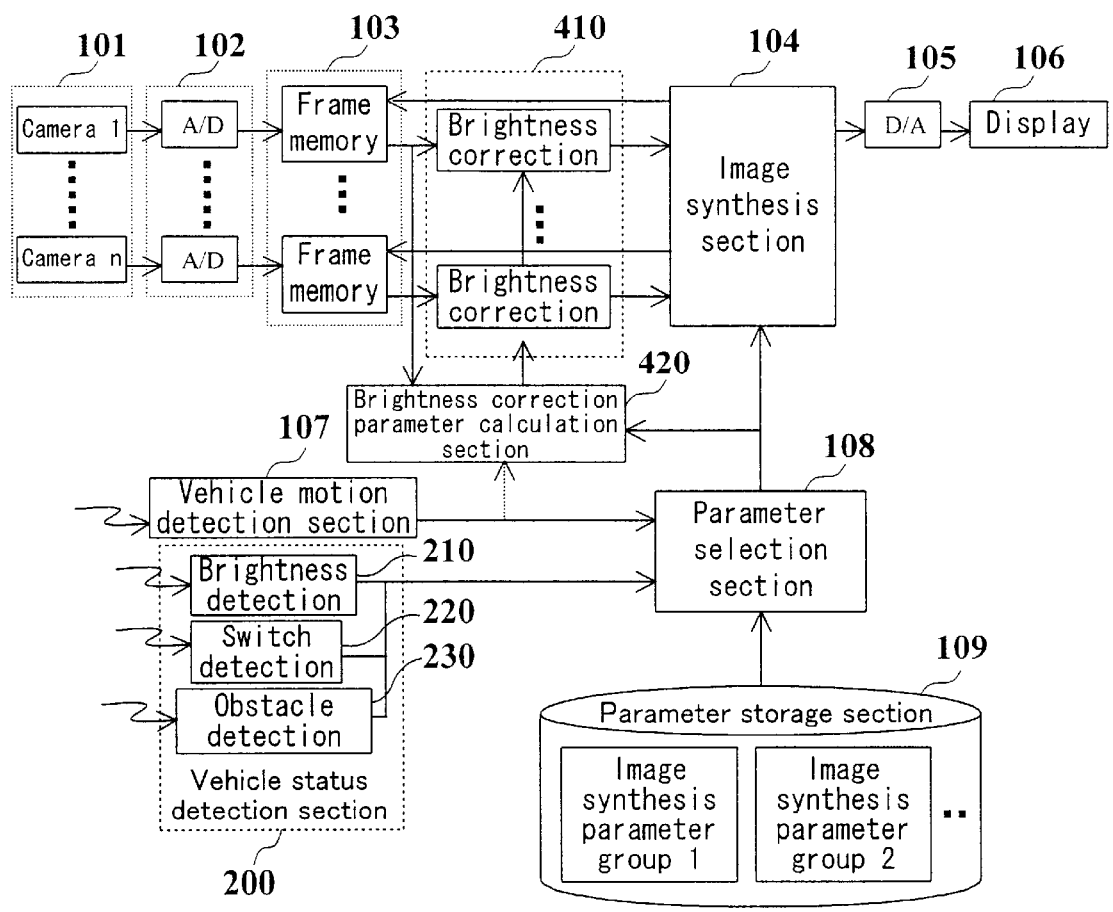
FIG. 12 is a structural view of a vehicle surroundings monitoring system of EMBODIMENT 3 of the present invention.

FIG. 12 illustrates a construction of a vehicle surroundings monitoring system of EMBODIMENT 3 of the present invention. This construction is different from the construction shown in FIG. 1 in that a brightness correction section 410 is provided between the frame memories 103 and the image synthesis section 104 to correct the brightness and tint of camera images. A brightness correction parameter calculation section 420 is also provided to calculate brightness correction parameters used by the brightness correction section 410.

FIGS. 13A to 13D illustrate an example of an image synthesis parameter group for generating a synthesized image from a plurality of camera images. FIGS. 13A and 13B are examples of images taken with two cameras placed on the rear of the vehicle. In the illustrated example, an image of the area just behind the vehicle is taken doubly by cameras 1 and 2. FIG. 13C shows an example of a synthesized image, and FIG. 13D shows an example of an image synthesis parameter group.

In the example shown in FIG. 13D, the parameter element at the coordinates (xo, yo) in the image synthesis parameter group indicates that a synthesized image should be generated by combining the pixel at the coordinates $(Xi_1, Yi_1)$ in the image from the camera 1 and the pixel at the coordinates $(Xi_2, Yi_2)$ in the image from the camera 2 at a weighting ratio of 0.7:0.3. The image synthesis section 104 assigns weights to the respective camera images and then adds, to sequentially output the results as a synthesized image. This enables generation of a smooth synthesized image free from formation of a conspicuous juncture due to difference in brightness and tint between the camera images, compared with the case of generating each pixel of a synthesized image from a single pixel of one camera image.

Moreover, in this embodiment, brightness correction parameters are calculated using information on an overlap area on a synthesized image.

Specifically, the image synthesis parameter group stored in the parameter storage section 109 includes overlap area data indicating the coordinates of a pixel in a camera image that corresponds to an overlap area on a synthesized image. The brightness correction parameter calculation section 420 receives the overlap area data included in the image synthesis parameter group and calculates a brightness correction parameter using brightness and tint data for the pixel in the camera image corresponding to the overlap area indicated by the overlap area data.

Figure 14A:
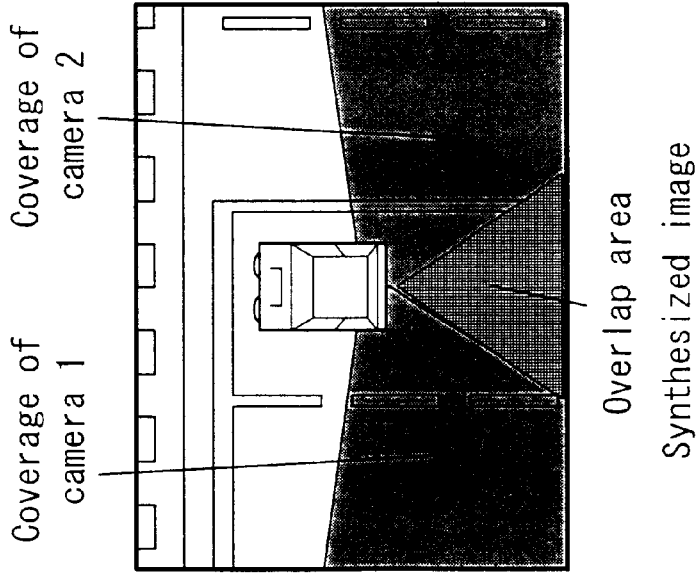
FIGS. 14A and 14B are views showing a synthesized image including an overlap area and an image synthesis parameter group for generating the synthesized image.
Figure 14B:
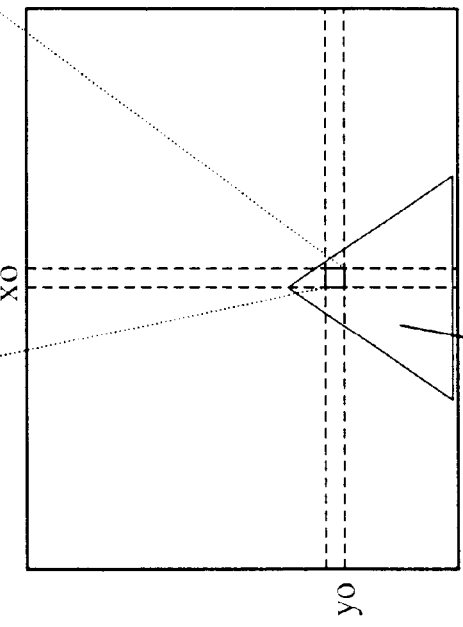

FIGS. 14A and 14B illustrate an example of a synthesized image including an overlap area and an example of an image synthesis parameter group for this synthesized image. In the synthesized image of FIG. 14A, the hatched portions represent the coverages of cameras 1 and 2, which overlap at the rear of the vehicle forming an overlap area. The image synthesis parameter group of FIG. 14B includes overlap area data indicating the coordinates of pixels in the camera images corresponding to the overlap area, as partly shown in FIG. 14B. That is, as the overlap area data it is shown that the pixel at the coordinates (Xi1, Yi1) in the image from camera 1 and the pixel at the coordinates (Yi2, Yi2) in the image from camera 2 correspond to the coordinates (xo, yo) in the overlap area.

It is possible to determine whether a given position is inside a non-overlap area or an overlap area depending on whether the weighting ratio is "1:0" or otherwise. Alternatively, a given position may be determined to be inside an overlap area if two or more effective camera numbers are specified, and inside a non-overlap area if only one effective camera is specified.

The parameter selection section 108 selects the image synthesis parameter group according to the vehicle speed detected by the vehicle motion detection section 107 and the vehicle status detected by the vehicle status detection section 200 based on predetermined criteria, sequentially reads the selected parameters by interlaced scanning, and outputs the results to the image synthesis section 104. The overlap area data in the image synthesis parameter group output from the parameter selection section 108 is also output to the brightness correction parameter calculation section 420.

The brightness correction parameter calculation section 420 determines the distributions of brightness and tint of the respective camera images in the overlap area, from the overlap area data output from the parameter selection section 108 and the pixel values read from the frame memories 103 by the image synthesis section 104, to calculate brightness correction parameters with which the distributions of brightness and tint of the respective camera images can substantially match with each other in the overlap area.

The brightness correction section 410 corrects the brightness for the pixel values read from the frame memories 103 by the image synthesis section 104 according to the brightness correction parameters calculated by the brightness correction parameter calculation section 420, and output the results to the image synthesis section 104. The image synthesis section 104 generates a synthesized image from the camera images of which brightness has been corrected by the brightness correction section 410, according to the image synthesis parameter group output from the parameter selection section 108.

A procedure of calculating the brightness correction parameters will be described in a specific example.

Assume that the brightness correction parameter calculation section 420 outputs as the brightness correction parameters a gain coefficient and an offset coefficient with which the averages and distributions of the brightness of respective camera images can match with each other in the overlap area. Also assume that the brightness correction section 410 corrects the pixel values of the respective camera images with a linear equation using the gain coefficient and the offset coefficient as the brightness correction parameters.

Assume that a plurality of overlap areas exist. For example, assume that there exist four overlap areas, a first overlap area formed by cameras 1 and 2, a second overlap area formed by cameras 1 and 3, a third overlap area formed by cameras 2 and 4, and a fourth overlap area formed by cameras 3 and 4.

First focusing on the first overlap area, the brightness correction parameter calculation section 420 accumulates images taken with the cameras 1 and 2 read from the frame memories 103 by the image synthesis section 104 by one frame each, and obtains the averages and distributions of the brightness of the images taken with the cameras 1 and 2 in the first overlap area. Likewise, for the second to fourth overlap areas, the averages and distributions of the brightness of camera images in each of the overlap areas are obtained.

Next, as brightness correction parameters, a gain and an offset are determined so that the averages and distributions of the brightness of the images from the cameras 1 and 2 in the first overlap area match with each other. For example, consider the case that the average and distribution of the brightness of the image from the camera 1 are 100 and 10, respectively, and the average and distribution of the brightness of the image from the camera 2 are 121 and 11, respectively. Then, the averages and distributions of the images from the cameras 1 and 2 will match with each other when the gain and the offset are set to 1 and 0 respectively for the image from the camera 1, and 10/11 and −10 respectively for the image from the camera 2.

Using the brightness correction parameters determined for the first overlap area, the average and distribution of the brightness of the image from the camera 1 in the second overlap area are corrected. Note that in this example where the gain is 1 and the offset is 0 for the image from the camera 1, no correction is required for the average and distribution of the brightness of the image from the camera 1. Brightness correction parameters for an image from the camera 3 are then determined so that the averages and distributions of the brightness of the images from the cameras 1 and 3 match with each other. Likewise, the average and distribution of the brightness of the image from the camera 2 in the third overlap area are corrected using the brightness correction parameters determined in the first overlap area. Brightness correction parameters for an image from the camera 4 are then determined so that the averages and distributions of the brightness of the images from the cameras 2 and 4 match with each other.

In the calculation procedure described above, proper brightness correction may not be obtained in the fourth overlap area. In view of this, as another calculation procedure, brightness correction parameters may be calculated temporarily in the respective overlap areas. For a camera image existing in a plurality of overlap areas, the average of the temporarily calculated brightness correction parameters may be determined as the final brightness correction parameters for the camera image. This procedure fails to completely match the brightness and the tint between camera images in each overlap area. However, as the entire synthesized image, it is expected that all of the overlap areas have no great displacement in brightness and tint.

When a plurality of overlap areas exist, the priorities given to the overlap areas to be followed during the calculation of brightness correction parameters may be determined according to the motion of the vehicle detected by the vehicle motion detection section 107.

For example, when the vehicle is moving backward, a high priority may be given to an overlap area located at the rear of the vehicle on the synthesized image. When the vehicle is moving forward, a high priority may be given to an overlap area located at the front of the vehicle on the synthesized image. In general, the driver tends to pay attention to the rear of the vehicle when driving backward and to the front of the vehicle when driving forward. Therefore, by giving priorities, the brightness and the tint can be made uniform in the overlap area at the position to which the driver tends to pay attention, although they may not be uniform in other overlap areas. The resultant synthesized image is therefore more natural for the driver.

As described above, in this embodiment, brightness correction parameters are calculated using data on the brightness and tint of pixels in camera images corresponding to an overlap area, and the brightness is corrected using the parameters. This enables generation of a smooth synthesized image free from formation of a conspicuous juncture due to difference in brightness and tint between the camera images.

The construction of FIG. 12 includes the brightness correction section 410. However, if the cameras 101 incorporate therein a function corresponding to that of the brightness correction section 410, the brightness correction section 410 may be omitted and thus the system construction can be simplified.

The technique for brightness correction is not limited to that described in this embodiment, but other techniques may also be used as long as the brightness and tint of camera images in an overlap area can be made close to each other, and substantially the same effect as that described in this embodiment can be attained.

In this embodiment, weighting information in the image synthesis parameter group was used to identify an overlap area. Alternatively, in place of the weighting information, some exclusive information indicating whether or not a given position is inside an overlap area may be included in the image synthesis parameter group.

Embodiment 4

In EMBODIMENT 4 of the present invention, in an overlap area of the coverages of a plurality of cameras, the selection of the camera images used for image synthesis and the setting of weights for the respective camera images are appropriately changed.

The construction of the vehicle surroundings monitoring system of this embodiment is substantially the same as that shown in FIG. 1, except that the parameter storage section 109, which is the same in construction, includes a plurality of image synthesis parameter groups different in the selection of camera images used for image synthesis in an overlap area.

FIG. 15 is a view showing the positions of cameras and obstacle sensors as the obstacle detection means 230 on a vehicle in this embodiment. Referring to FIG. 15, cameras 1 and 2 are placed on pillars at the rear of the vehicle, where the camera 1 takes images on the left side of the rear area of the vehicle, while the camera 2 takes images on the right side thereof. The coverages of the cameras 1 and 2 overlap in the rear of the vehicle. Two obstacle sensors are placed on the rear of the vehicle to enable detection of an obstacle in the rear area of the vehicle.

Figure 16A:
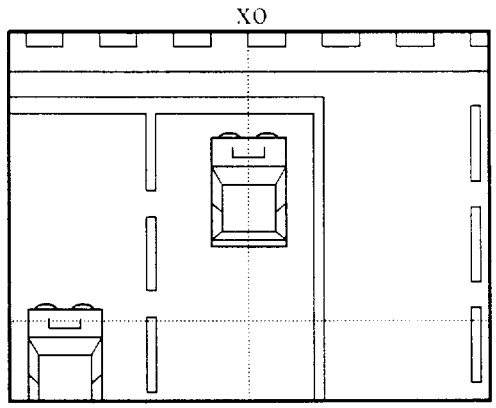
FIGS. 16A to 16C are views showing a synthesized image and image synthesis parameter groups for generating the synthesized image.
Figure 16B:
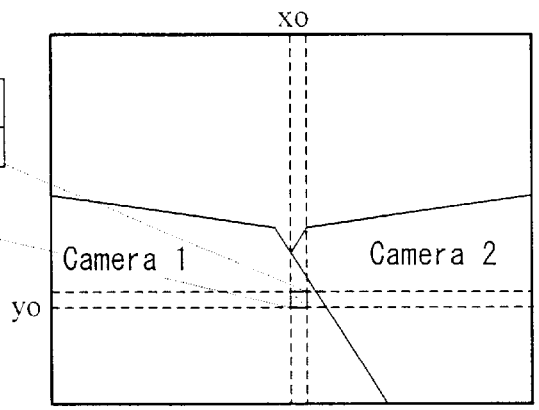
Figure 16C:
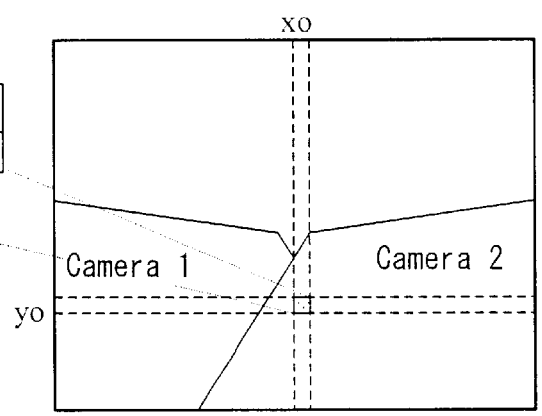

FIGS. 16A to 16C are views illustrating examples of a synthesized image and image synthesis parameter groups for generation of the synthesized image. FIG. 16A illustrates a synthesized image, and FIGS. 16B and 16C illustrate two image synthesis parameter groups A and B for generation of the synthesized image of FIG. 16A. The image synthesis parameter group A (FIG. 16B) and the image synthesis parameter group B (FIG. 16C) are used to generate the same synthesized image in composition (FIG. 16A), but use a different camera image for image synthesis in the overlap area in the rear of the vehicle. The image synthesis parameter group A uses an image from the camera 1 while the image synthesis parameter group B uses an image from the camera 2.

The operation of the vehicle surroundings monitoring system of this embodiment will be described.

When the obstacle detection means 230 detects an obstacle on the right or left side of the rear area of the vehicle, it outputs the position of the detected obstacle to the parameter selection section 108. The parameter selection section 108 selects an image synthesis parameter group according to the position of the detected obstacle and the switch operation by the user.

For example, the image synthesis parameter group A is selected when the obstacle exists on the left side of the rear area, and the image synthesis parameter group B is selected when the obstacle exists on the right side of the rear area. The image synthesis section 104 reads camera images from the frame memories 103 according to the selected image synthesis parameter group to generate a synthesized image.

Figure 17A:
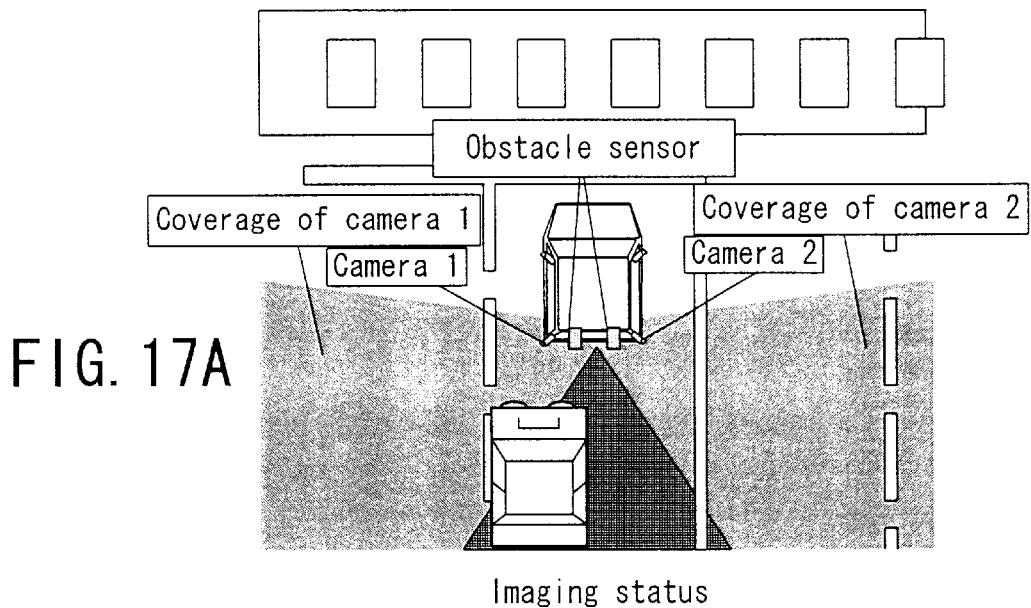
FIGS. 17A to 17C are views showing examples of selection of an image synthesis parameter group in EMBODIMENT 4 of the present invention.
Figure 17B:
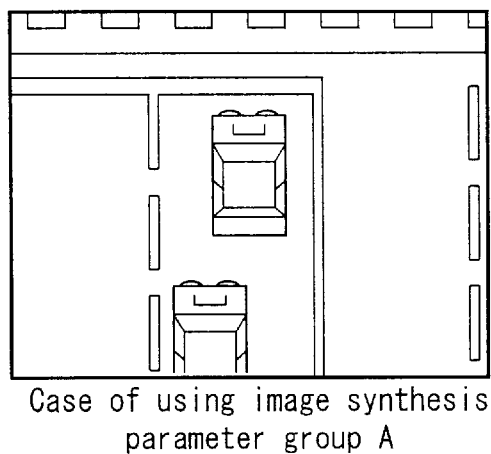
Figure 17C:
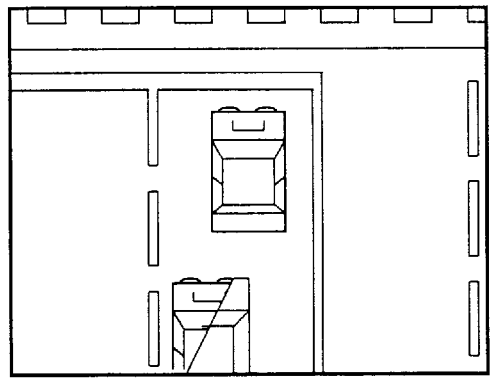

By the operation described above, in the case shown in FIG. 17A, for example, where an obstacle such as another vehicle exists on the left side of the rear area, the image synthesis parameter group A is selected. This makes the juncture formed between the camera images less conspicuous on the resultant synthesized image as shown in FIG. 17B. If the image synthesis parameter group B is selected, the juncture between the camera images will run across the obstacle vehicle on the synthesized image, making the vehicle unnatural with the juncture as shown in FIG. 17C. In other words, by selecting the image synthesis parameter group according to the position of an obstacle, the existence of the juncture can be made less conspicuous on the synthesized image, and thus a synthesized image with natural appearance can be generated.

The parameter selection section 108 may otherwise switch the image synthesis parameter group according to the motion of the vehicle detected by the vehicle motion detection section 107, in place of the output from the vehicle status detection section 200. By switching in this manner, the camera image used for image synthesis in the overlap area can be switched according to the direction and speed of the driving of the vehicle. Therefore, by selecting a camera image from a camera of which coverage is closer to the forward area of the vehicle, for example, it is possible to reduce formation of a juncture between camera images in and around an area mostly viewed by the driver, and thus display a synthesized image with which the driver can feel easy in driving. Naturally, it is also possible to use both the outputs from the vehicle status detection section 200 and the vehicle motion detection section 107.

Figure 18:
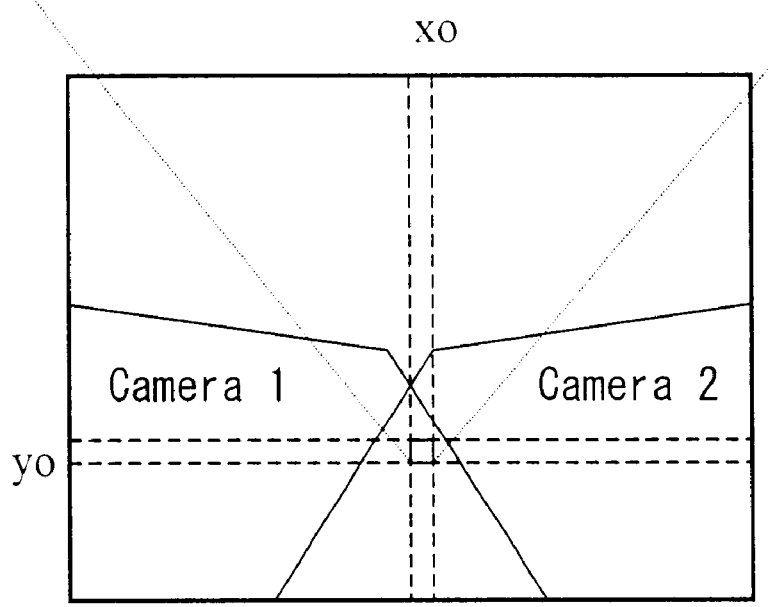
FIG. 18 is a view showing another image synthesis parameter group in EMBODIMENT 4 of the present invention.

FIG. 18 illustrates another example of the image synthesis parameter group in this embodiment. The image synthesis parameter group of FIG. 18 includes a plurality of sets of weighting information for camera images in an overlap area on a synthesized image. For example, the position at the coordinates (x0, y0) in the image synthesis parameter group is a position at which a pixel at the coordinates (Xi1, Yi1) in a camera image from the camera 1 and a pixel at the coordinates (Xi2, Yi2) in a camera image from the camera 2 overlap with each other. This position includes two sets of weighting information, A (0.7:0.3) and B (0.2:0.8) as the weighting ratio used during synthesis.

The parameter selection section 108 selects one of a plurality of sets of weighting information included in the image synthesis parameter group according to the output of the vehicle status detection section 200. For example, the weighting information A is selected when an obstacle exists on the left side of the rear area of the vehicle, and the weighting information B is selected when an obstacle exists on the right side.

Thus, by selecting weighting information for image synthesis according to the position of an obstacle, it is possible to reduce the unnaturalness of the juncture formed between the camera images on a synthesized image and thus generate a synthesized image with a smoother juncture.

Figure 19:
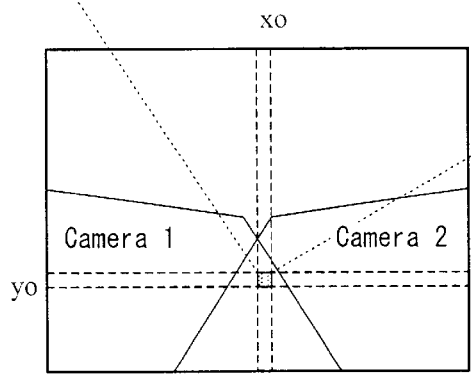
FIG. 19 is a view showing yet another exemplary image synthesis parameter group in EMBODIMENT 4 of the present invention.

FIG. 19 illustrates yet another example of the image synthesis parameter group in this embodiment. The image synthesis parameter group of FIG. 19 is equivalent to that of FIG. 18 except that one weight reference number indicating a combination of sets of weighting information is given, in place of sets of weighting information, for each pixel.

In the example shown in FIG. 19, the weight reference number for the coordinates (x0, y0) in the image synthesis parameter group is "3". By referring to another table, it is found that the weight reference number "3" indicates that the weighting ratio of the pixels to be combined is 0.7:0.3 (weighting information A) or 0.2:0.8 (weighting information B).

While the image synthesis parameter group of FIG. 18 needs to hold four values as weighting information for each coordinate position, the image synthesis parameter group of FIG. 19 can hold only one weight reference information value. This indicates that the data amount of the image synthesis parameter group of FIG. 19 is smaller as the number of pixels in the image synthesis parameter group is greater or the number of combinations of sets of weighting information is smaller.

Thus, the data amount of the image synthesis parameter group can be reduced by holding the weight reference number indicating a combination of a plurality of sets of weighting information, in place of holding a plurality of sets of weighting information, for each coordinate position in the image synthesis parameter group.

Figure 20A:
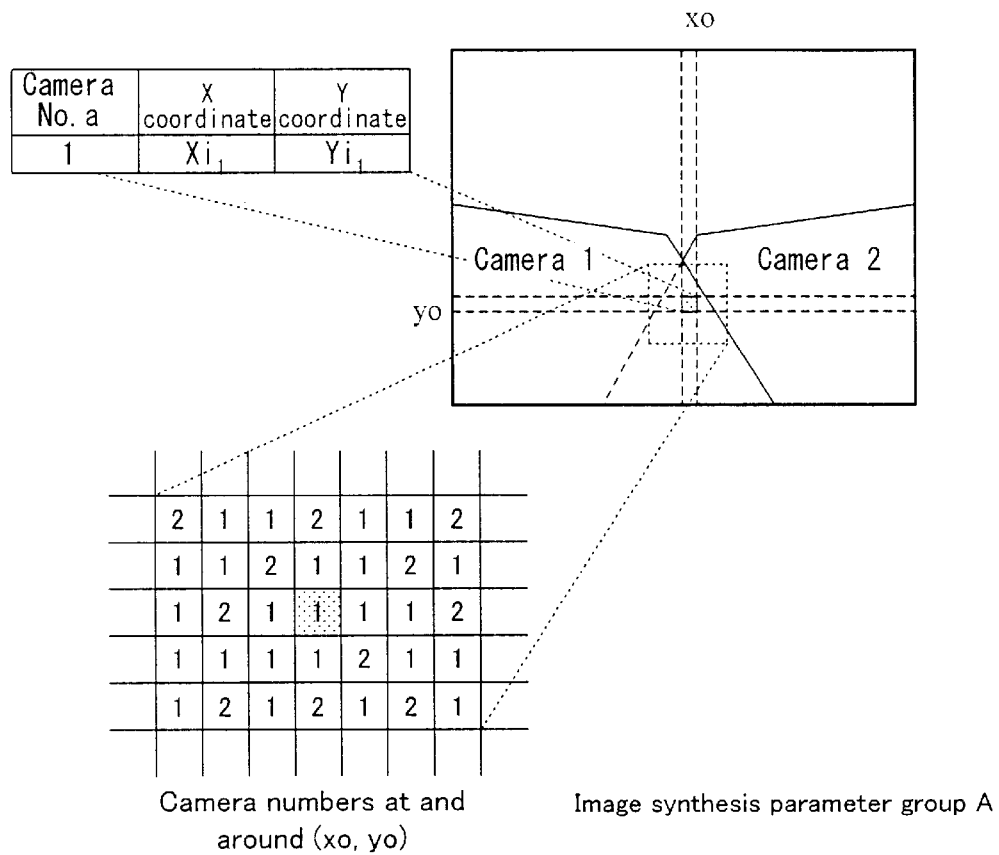
FIGS. 20A and 20B are views showing other image synthesis parameter groups in EMBODIMENT 4 of the present invention.
Figure 20B:
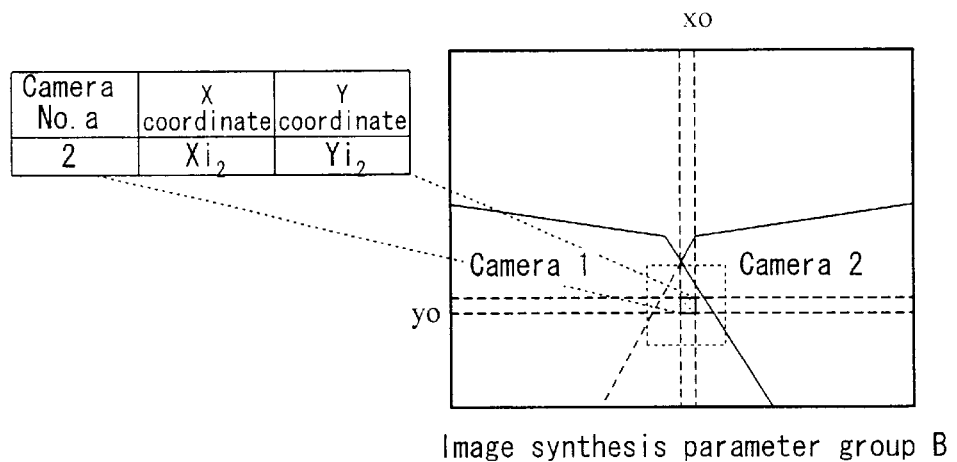

FIGS. 20A and 20B illustrate other examples of the image synthesis parameter groups in this embodiment, which are generated using a dithering method based on the image synthesis parameter group of FIG. 18.

The image synthesis parameter group A of FIG. 20A is generated by a so-called dithering method, where, based on the camera numbers and the weighting information A for each pixel in the image synthesis parameter group of FIG. 18, one of the two camera images is selected for each pixel in the vicinity of a given pixel so that the ratio of the number of pixels using one camera image to that using the other camera image is close to the specified weighting ratio. Likewise, the image synthesis parameter group B of FIG. 20B is generated based on the camera numbers and the weighting information B for each pixel in the image synthesis parameter group of FIG. 18.

In the weighting information A in the image synthesis parameter group of FIG. 18, at the coordinates (x0, y0), the weights are 0.7 for the camera 1 and 0.3 for the camera 2. In the image synthesis parameter group A of FIG. 20A, the camera number is selected so that the ratio of the number of pixels using the camera 1 to that using the camera 2 is close to 0.7:0.3 in the vicinity of the pixel at the coordinates (x0, y0). Thus, in the example shown in FIG. 20A, although the camera 1 is selected for the coordinates (x0, y0), the ratio of the number of pixels using the camera 1 to that using the camera 2 is about 0.7:0.3 at and around (x0, y0).

The dithering method described above is widely known and disclosed in "Television image information engineering hand-book", ed. by The Institute of Image Information and Television Engineers, Ohmsha, Ltd., and the like. Detailed description on the method for selecting camera images is therefore omitted here.

The parameter selection section 108 selects the image synthesis parameter group A or B according to the output of the vehicle status detection section 200.

Thus, by selecting one from a plurality of dithered image synthesis parameter groups according to the position of an obstacle for image synthesis, it is possible to reduce the unnaturalness of the juncture formed between the camera images on a synthesized image and thus generate a synthesized image with a smoother juncture.

The total data amount of the image synthesis parameter group A of FIG. 20A and the image synthesis parameter group B of FIG. 20B is smaller than the data amount of the image synthesis parameter group of FIG. 18 by the amount of weighting information.

Moreover, when image synthesis is performed using the image synthesis parameter group A of FIG. 20A or the image synthesis parameter group B of FIG. 20B, the number of pixels read from the frame memories 103 by the image synthesis section 104 is smaller, and the amount of calculation by the image synthesis section 104 is smaller by the addition of the weighting, compared with the image synthesis using the weight-added image synthesis parameter group of FIG. 18.

Thus, the use of the image synthesis parameter group generated by the dithering method provides the effect of reducing the processing amount required for image synthesis, in addition to the effect of reducing the data amount of the image synthesis parameter group, compared with the use of the weighting information-added image synthesis parameter.

In the embodiments described above, the display 106 displays interlaced scanning images, and the parameter selection section 108, 320 reads an image synthesis parameter group by interlaced scanning. The same effects as those described in the respective examples can also be obtained by adopting non-interlaced scanning in both operations.

In the embodiments described above, each image synthesis parameter group is data in the form of a table indicating the correspondence between the coordinates in camera images and the coordinates in a synthesized image. Alternatively, it may be described in other forms such as a mathematical expression including variables and a program as long as the correspondence between camera images and a synthesized image is clarified. When such forms are adopted, the image synthesis section may be constructed to obtain corresponding coordinates using an image synthesis parameter group described in the form of a mathematical expression including variables or a program. Japanese Patent Application No. 10-217261, for example, discloses a method for generating image synthesis parameter groups described in the forms of a mathematical expression including variables and a program.

In the embodiments described above, it was assumed that the image synthesis parameter group included elements having one-to-one correspondence with the coordinates of pixels in a one-frame synthesized image and had the same size as that of the synthesized image. The size of the image synthesis parameter group is not necessarily the same as that of the synthesized image. For example, an image synthesis parameter group having a size larger than the synthesized image may be prepared, and a portion having the same size as the synthesized image may be cut out from this image synthesis parameter group to be used for image synthesis.

In the above embodiments, the monitoring system and the image processor of the present invention were described as being applied to cars. Alternatively, they may be applied to other types of vehicles such as shipping and airplanes. Otherwise, cameras may be placed on a non-mobile object to be monitored such as a store, a house, a showroom, and the like.

The positions of a plurality of cameras and the number of cameras are not limited to those described above.

Figure 21:
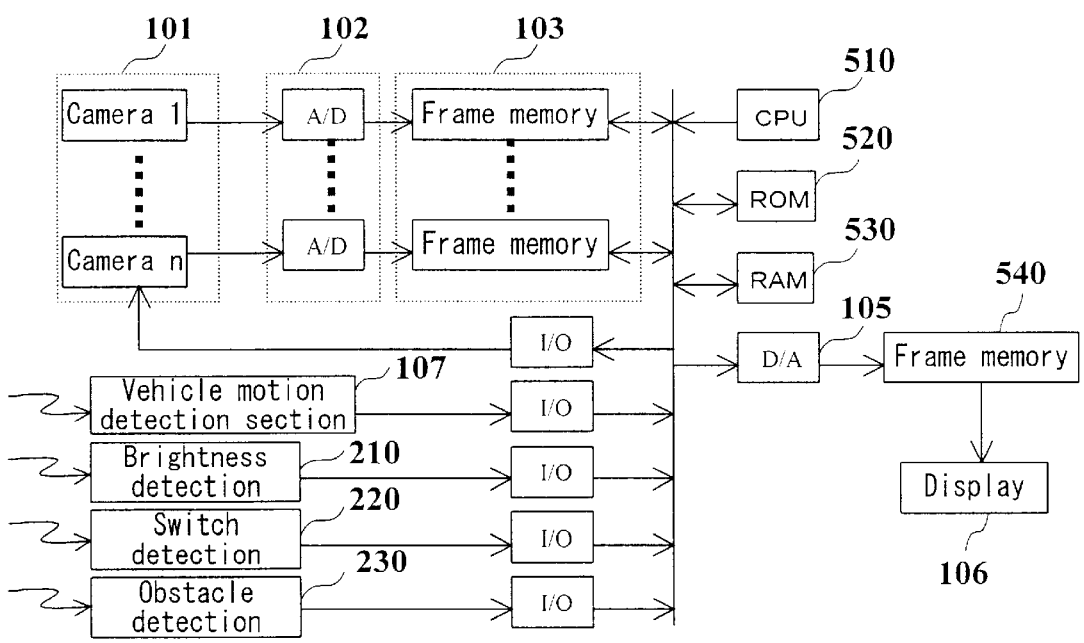
FIG. 21 is a view showing another construction for implementing the present invention.
Figure 22A:
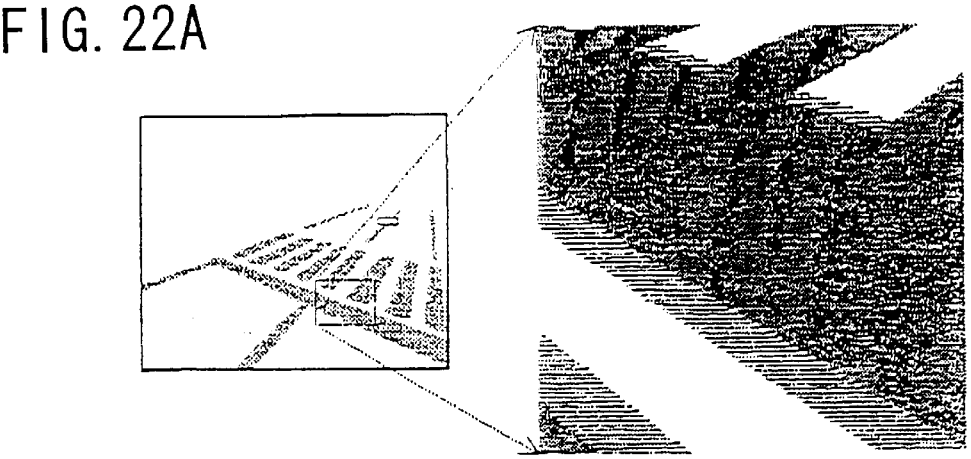
FIGS. 22A to 22C are views for description of conventional problems.
Figure 22B:
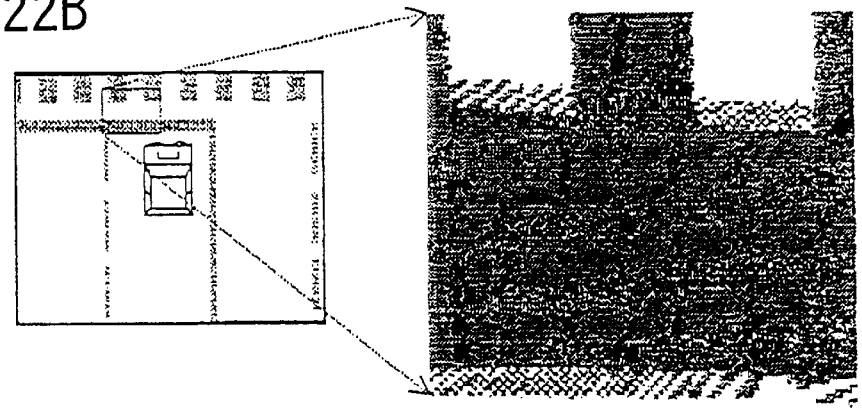
Figure 22C:
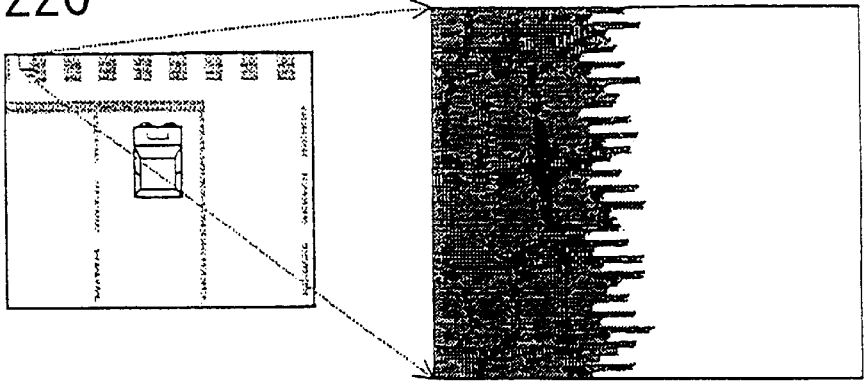
Figure 23A:
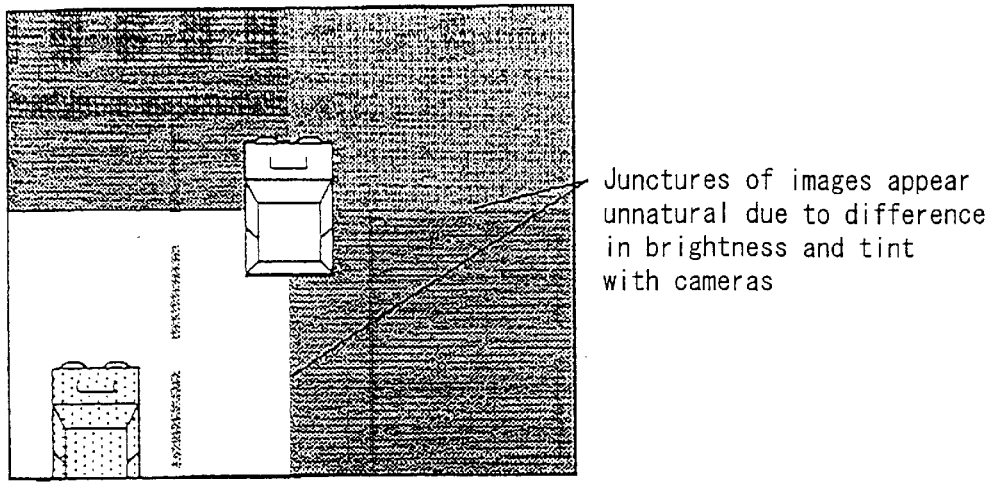
FIGS. 23A and 23B are views for description of conventional problems.
Figure 23B:
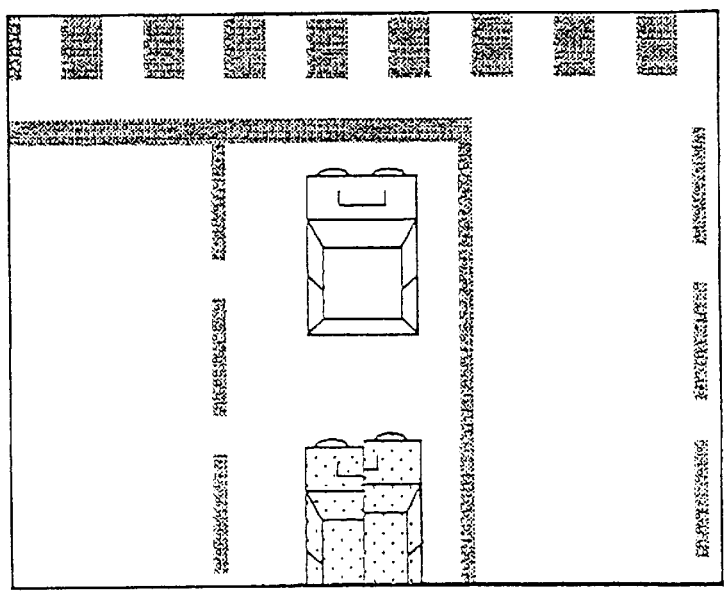

The function of the image processor of the present invention may be implemented by hardware entirely or partially using exclusive equipment, or may be implemented by software. It is also possible to use a recording medium or a transmission medium storing a program programmed to enable a computer to execute the entire or partial function of the image processor of the present invention. For example, a computer as shown in FIG. 21 may be used, where the processing means such as the image synthesis section and the parameter selection section may be implemented by a software program executed by a CPU 510 and the results may be stored in a ROM 520 or a RAM 530.

Thus, according to the present invention, it is possible to reduce the unnaturalness of a synthesized image observed when the vehicle is moving and also prevent the reduction in resolution observed when the vehicle is standing still. In addition, aliasing distortion on a synthesized image can be effectively suppressed. Moreover, it is possible to reduce the unnaturalness of the juncture formed between camera images on a synthesized image.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. An image processor for receiving camera images taken with a plurality of cameras capturing the surroundings of a vehicle and generating a synthesized image from the camera images, the image processor comprising:

a parameter generation section constructed to be able to generate a plurality of image synthesis parameter groups each representing the correspondence between the camera images and the synthesized image and having different spatial or temporal resolution relations, wherein the synthesized image is generated from the camera images according to the image synthesis parameter group generated by the parameter generation section, and the parameter generation section switches the image synthesis parameter group to be generated according to an output of a vehicle motion detection section for detecting the motion of the vehicle.

2. The image processor of claim 1, wherein the parameter generation section comprises:

a parameter storage section for storing the plurality of image synthesis parameter groups, and a parameter selection section for selecting at least one among the plurality of image synthesis parameter groups stored in the parameter storage section according to the output of the vehicle motion detection section.

3. The image processor of claim 1, wherein the camera images are interlaced images, and the plurality of image synthesis parameter groups include at least a frame-base image synthesis parameter group and a field-base image synthesis parameter group.

4. The image processor of claim 3, wherein the parameter generation section generates the field-base image synthesis parameter group when the motion of the vehicle detected by the vehicle motion detection section is relatively fast, and generates the frame-base image synthesis parameter group when the motion of the vehicle is relatively slow.

5. the image processor of claim 1, wherein the vehicle motion detection section detects the motion of the vehicle from the camera images.

6. The image processor of claim 1, wherein the plurality of cameras are constructed to be able to switch a capture pattern according to an input switch signal, and the parameter generation section sends the switch signal to the cameras, together with generating the image synthesis parameter group, according to the output of the vehicle motion detection section, to switch the capture patterns of the cameras.

7. The image processor of claim 6, wherein the parameter generation section selects the image synthesis parameter group and switches the capture patterns of the cameras according to an output of a vehicle status detection section for detecting brightness of the surroundings of the vehicle, in addition to the output of the vehicle motion detection section.

8. The image processor of claim 1, wherein the parameter generation section generates the image synthesis parameter group according to an output of a vehicle status detection section for detecting the vehicle status such as an operation by a driver of the vehicle or whether or not an obstacle exists in the surroundings of the vehicle, in addition to the output of the vehicle motion detection section.

9. A monitoring system comprising:

a plurality of cameras for capturing the surroundings of a vehicle;

an image processing section for receiving camera images from the plurality of cameras and generating a synthesized image from the camera images; and a display section for displaying the synthesized image generated by the image processing section, wherein the image processing section comprises a parameter generation section constructed to be able to generate a plurality of image synthesis parameter groups each representing the correspondence between the camera images and the synthesized image and having different spatial or temporal resolution relations, the synthesized image is generated from the camera images according to the image synthesis parameter group generated by the parameter generation section, and the parameter generation section generates at least one of the plurality of image synthesis parameter groups according to an output of a vehicle motion detection section for detecting the motion of the vehicle.

* * * * *

UNITED STATES PATENT AND TRADEMARK OFFICE
CERTIFICATE OF CORRECTION

PATENT NO. : 6,734,896 B2
DATED : May 11, 2004
INVENTOR(S) : Kunio Nobori et al.

It is certified that error appears in the above-identified patent and that said Letters Patent is hereby corrected as shown below:

Title page,
Item [56], References Cited, U.S. PATENT DOCUMENTS, please add the following:
-- 5,410,346    04/1995    Saneyoshi et al.
5,892,855    04/1999    Kakinami et al. --
FOREIGN PATENT DOCUMENTS, please add the following:
-- EP    0949818 A2    10/1999
JP    58-110334    6/1983
JP    11-331834    11/1999
JP    10-257482    9/1998 --

Signed and Sealed this

Twenty-eighth Day of June, 2005

JON W. DUDAS
*Director of the United States Patent and Trademark Office*